US00RE45855E

(19) United States
(12) Reissued Patent
Coronato et al.

(10) Patent Number: US RE45,855 E
(45) **Date of Reissued Patent: *Jan. 19, 2016**

(54) MICROELECTROMECHANICAL SENSOR WITH IMPROVED MECHANICAL DECOUPLING OF SENSING AND DRIVING MODES

(71) Applicant: STMicroelectronics S.r.l., Agrate Brianza (IT)

(72) Inventors: Luca Coronato, Corsico (IT); Alessandro Balzelli Ludovico, Cornaredo (IT); Sarah Zerbini, Fontanellato (IT)

(73) Assignee: STMicroelectronics S.r.l., Agrate Brianza (IT)

( * ) Notice: This patent is subject to a terminal disclaimer.

(21) Appl. No.: 14/062,671

(22) Filed: Oct. 24, 2013

Related U.S. Patent Documents

Reissue of:
(64) Patent No.: 8,042,396
Issued: Oct. 25, 2011
Appl. No.: 12/208,980
Filed: Sep. 11, 2008

U.S. Applications:
(60) Provisional application No. 60/971,496, filed on Sep. 11, 2007.

(51) Int. Cl.
*G01C 19/56* (2012.01)
*G01C 19/5712* (2012.01)

(52) U.S. Cl.
CPC ..... *G01C 19/5712* (2013.01)

(58) Field of Classification Search
CPC ..... G01C 19/5719; G01C 19/5712; G01C 19/5747; G01P 15/125; G01P 15/18
USPC ..... 73/504.02, 504.03, 504.08, 504.11, 73/504.12, 504.13
See application file for complete search history.

(56) References Cited

U.S. PATENT DOCUMENTS 4,159,125 A 6/1979 Buchwald
5,447,068 A 9/1995 Tang
(Continued)

FOREIGN PATENT DOCUMENTS

CN 1813194 A 8/2006
DE 196 41 284 C1 5/1998
(Continued)

OTHER PUBLICATIONS

Durante et al., "Microelectromechanical Integrated Sensor Stucture With Rotary Driving Motion," Office Action mailed Apr. 24, 2009, in U.S. Appl. No. 11/684,243, filed Mar. 9, 2007, 10 pages.
(Continued)

*Primary Examiner* — Kenneth J Whittington
(74) *Attorney, Agent, or Firm* — Seed IP Law Group PLLC

(57) ABSTRACT

A driving mass of an integrated microelectromechanical structure is moved with a rotary motion about an axis of rotation, and a sensing mass is connected to the driving mass via elastic supporting elements so as to perform a detection movement in the presence of an external stress. The driving mass is anchored to a first anchorage arranged along the axis of rotation by first elastic anchorage elements. The driving mass is also coupled to a pair of further anchorages positioned externally thereof and coupled to opposite sides with respect to the first anchorage by further elastic anchorage elements; the elastic supporting elements and the first and further elastic anchorage elements render the driving mass fixed to the first sensing mass in the rotary motion, and substantially decoupled from the sensing mass in the detection movement, the detection movement being a rotation about an axis lying in a plane.

18 Claims, 3 Drawing Sheets

(56) References Cited

U.S. PATENT DOCUMENTS

| | | | | |
|---|---|---|---|---|
| 5,728,936 | A | 3/1998 | Lutz | |
| 5,889,207 | A | 3/1999 | Lutz | |
| 5,895,850 | A | 4/1999 | Buestgens | |
| 6,062,082 | A | 5/2000 | Guenther et al. | |
| 6,189,381 | B1 * | 2/2001 | Huang et al. | 73/504.12 |
| 6,230,563 | B1 | 5/2001 | Clark et al. | |
| 6,244,111 | B1 | 6/2001 | Funk | |
| 6,250,156 | B1 | 6/2001 | Seshia et al. | |
| 6,250,157 | B1 * | 6/2001 | Touge | 73/504.12 |
| 6,308,567 | B1 | 10/2001 | Higuchi et al. | |
| 6,349,597 | B1 | 2/2002 | Folkmer et al. | |
| 6,374,672 | B1 | 4/2002 | Abbink et al. | |
| 6,508,124 | B1 | 1/2003 | Zerbini et al. | |
| 6,513,380 | B2 | 2/2003 | Reeds, III et al. | |
| 6,520,017 | B1 | 2/2003 | Schoefthaler et al. | |
| 6,535,800 | B2 | 3/2003 | Wallner | |
| 6,626,039 | B1 | 9/2003 | Adams et al. | |
| 6,715,352 | B2 | 4/2004 | Tracy | |
| 6,722,197 | B2 | 4/2004 | Knowles et al. | |
| 6,752,017 | B2 | 6/2004 | Willig et al. | |
| 6,766,689 | B2 | 7/2004 | Spinola Durante et al. | |
| 6,837,107 | B2 | 1/2005 | Geen | |
| 6,848,304 | B2 | 2/2005 | Geen | |
| 6,894,576 | B2 | 5/2005 | Giousouf et al. | |
| 6,918,298 | B2 | 7/2005 | Park | |
| 6,928,872 | B2 | 8/2005 | Durante et al. | |
| 6,952,965 | B2 * | 10/2005 | Kang et al. | 73/504.12 |
| 7,100,446 | B1 | 9/2006 | Acar et al. | |
| 7,155,976 | B2 | 1/2007 | Kai-Cheng | |
| 7,240,552 | B2 | 7/2007 | Acar et al. | |
| 7,258,012 | B2 | 8/2007 | Xie | |
| 7,284,429 | B2 | 10/2007 | Chaumet et al. | |
| 7,322,242 | B2 | 1/2008 | Merassi et al. | |
| 7,347,094 | B2 | 3/2008 | Geen et al. | |
| 7,398,683 | B2 | 7/2008 | Lehtonen | |
| 7,437,933 | B2 | 10/2008 | Durante et al. | |
| 7,454,246 | B2 | 11/2008 | Merfeld | |
| 7,461,552 | B2 | 12/2008 | Acar | |
| 7,481,111 | B2 | 1/2009 | Caminada et al. | |
| 7,513,155 | B2 | 4/2009 | Jeong | |
| 7,520,169 | B2 | 4/2009 | Schwarzelbach | |
| 7,677,099 | B2 * | 3/2010 | Nasiri et al. | 73/504.12 |
| 7,694,563 | B2 * | 4/2010 | Durante et al. | 73/504.12 |
| 7,797,998 | B2 | 9/2010 | Menard et al. | |
| 7,907,177 | B2 | 3/2011 | Haino et al. | |
| 8,037,756 | B2 | 10/2011 | Caminada et al. | |
| 8,042,394 | B2 | 10/2011 | Coronato et al. | |
| 8,042,396 | B2 | 10/2011 | Coronato et al. | |
| 8,096,181 | B2 | 1/2012 | Fukumoto | |
| 8,261,614 | B2 | 9/2012 | Hartmann et al. | |
| 8,272,267 | B2 | 9/2012 | Tamura et al. | |
| 8,342,023 | B2 | 1/2013 | Geiger | |
| 8,353,212 | B2 | 1/2013 | Hammer | |
| 8,549,919 | B2 | 10/2013 | Günthner et al. | |
| 2002/0189351 | A1 | 12/2002 | Reeds et al. | |
| 2002/0189354 | A1 * | 12/2002 | Durante et al. | 73/504.12 |
| 2004/0035204 | A1 * | 2/2004 | Durante et al. | 73/504.04 |
| 2006/0112764 | A1 | 6/2006 | Higuchi | |
| 2007/0062282 | A1 | 3/2007 | Akashi et al. | |
| 2007/0214883 | A1 | 9/2007 | Durante et al. | |
| 2008/0276706 | A1 | 11/2008 | Hartmann et al. | |
| 2009/0064780 | A1 | 3/2009 | Coronato et al. | |
| 2009/0100930 | A1 * | 4/2009 | Coronato et al. | 73/504.12 |
| 2010/0126269 | A1 * | 5/2010 | Coronato et al. | 73/504.04 |
| 2010/0126272 | A1 * | 5/2010 | Coronato et al. | 73/504.14 |
| 2010/0154541 | A1 * | 6/2010 | Cazzaniga et al. | 73/504.12 |
| 2010/0199764 | A1 | 8/2010 | Hammer | |
| 2010/0281977 | A1 * | 11/2010 | Coronato et al. | 73/504.14 |
| 2012/0060604 | A1 | 3/2012 | Neul et al. | |

FOREIGN PATENT DOCUMENTS

| | | | |
|---|---|---|---|
| DE | 10 2004 017 480 | A1 | 10/2005 |
| DE | 10 2007 012 163 | A1 | 10/2007 |
| DE | 10 2006 046 772 | A1 | 4/2008 |
| EP | 0 971 208 | A2 | 1/2000 |
| EP | 1 253 399 | A1 | 10/2002 |
| EP | 1 365 211 | A1 | 11/2003 |
| EP | 1 617 178 | A1 | 1/2006 |
| EP | 1 619 471 | A1 | 1/2006 |
| EP | 1 624 286 | A1 | 2/2006 |
| EP | 1 832 841 | A1 | 9/2007 |
| EP | 1 962 054 | A1 | 8/2008 |
| JP | 2005-241500 | A | 9/2005 |
| WO | 00/29855 | A1 | 5/2000 |
| WO | 02/103364 | A2 | 12/2002 |
| WO | 2006/043890 | A1 | 4/2006 |
| WO | 2007/086849 | A1 | 8/2007 |
| WO | 2007/145113 | A1 | 12/2007 |
| WO | 2009/033915 | A1 | 3/2009 |
| WO | 2009/087858 | A1 | 7/2009 |

OTHER PUBLICATIONS

Schofield et al., "Multi-Degree of Freedom Tuning Fork Gyroscope Demonstrating Shock Rejection," IEEE Sensors 2007 Conference, Atlanta, Georgia, Oct. 28-31, 2007, pp. 120-123.

Ing. Luca Coronato, "Re: Reissue U.S. Appl. No. 14/062,671: Microelectromechanical Sensor With Improved Mechanical Decoupling of Sensing and Driving Modes," Refusal Letter, dated Mar. 31, 2015, and received on Apr. 2, 2015, 3 pages.

US Office Action mailed Apr. 24, 2009, in U.S. Appl. No. 11/684,243, filed Mar. 9, 2007.

* cited by examiner

AMENDED

MICROELECTROMECHANICAL SENSOR WITH IMPROVED MECHANICAL DECOUPLING OF SENSING AND DRIVING MODES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*More than one reissue application has been filed for the reissue of U.S. patent application Ser. No. 12/208,980, filed Sep. 11, 2008, which issued as U.S. Pat. No. 8,042,396. The reissue applications are application Ser. No. 14/062,671 (the present application), filed on Oct. 24, 2013 and Ser. No. 14/871,240, filed on Sep. 30, 2015, both of which are reissues of U.S. patent application Ser. No. 12/208,980, filed Sep. 11, 2008.*

BACKGROUND

1. Technical Field

The present invention relates to a microelectromechanical sensor having improved mechanical decoupling of sensing and driving modes. In particular, in the following description reference will be made to a gyroscope (whether uniaxial, biaxial or triaxial), which can possibly operate as an accelerometer (whether uniaxial, biaxial or triaxial).

2. Description of the Related Art

As is known, microprocessing techniques enable formation of microelectromechanical structures or systems (the so-called MEMS) within layers of semiconductor material, which have been deposited (for example, in the case of a layer of polycrystalline silicon) or grown (for example, in the case of an epitaxial layer) on top of sacrificial layers, which are removed by chemical etching. Inertial sensors, accelerometers and gyroscopes obtained with this technology are encountering an increasing success, for example in the automotive field, in inertial navigation, or in portable devices.

In particular, integrated semiconductor gyroscopes are known, which are made with MEMS technology. Gyroscopes operate according to the theorem of relative accelerations, exploiting Coriolis acceleration. When an angular velocity is imparted on a movable mass that is moving with a linear velocity, the movable mass "feels" an apparent force, referred to as Coriolis force, which causes a displacement thereof in a direction perpendicular to the direction of the linear velocity and to the axis of rotation. The movable mass is supported via springs that enable a displacement in the direction of the apparent force. According to Hooke's law, the displacement is proportional to the apparent force, and consequently, based on the displacement of the movable mass, it is possible to detect the Coriolis force and the angular velocity that has generated it. The displacement of the movable mass can, for example, be detected capacitively, by measuring, in resonance conditions, the capacitance variations caused by the movement of movable electrodes, integrally fixed to the movable mass and operatively coupled to fixed electrodes.

US2007/214883, assigned to STMicroelectronics Srl, discloses a microelectromechanical integrated sensor with a rotary driving motion, which is sensitive to pitch and roll angular velocities.

This microelectromechanical sensor includes a single driving mass, anchored to a support at a single central point and driven with rotary motion about an axis, which passes through the central point and is orthogonal to the plane of the driving mass. The rotation of the driving mass enables two mutually orthogonal components of driving velocity in the plane of the mass. At least one through opening is provided inside the driving mass, in which a sensing mass is arranged; the sensing mass is enclosed within the driving mass, suspended with respect to the substrate, and connected to the driving mass via flexible elements. The sensing mass is fixed to the driving mass during its rotary motion, and has a further degree of freedom of movement as a function of an external stress, in particular a Coriolis force acting on the sensor. The flexible elements, according to their particular construction, allow the sensing mass to perform a rotary movement of detection about an axis lying in the plane of the sensor in response to a Coriolis acceleration acting in a direction perpendicular to the plane, in a way substantially decoupled from the driving mass. The microelectromechanical structure, in addition to being compact (in so far as it envisages just one driving mass that encloses in its overall dimensions one or more sensing masses), enables with minor structural modifications, a uniaxial, biaxial or triaxial gyroscope (and/or an accelerometer, according to the electrical connections implemented) to be obtained, at the same time ensuring decoupling of the driving mass from the sensing mass during the movement of detection.

In detail, and as shown in FIG. 1, that relates to a uniaxial sensor, the microelectromechanical sensor, denoted with 1, comprises a driving structure formed by a driving mass 3 and by a driving assembly 4. The driving mass 3 has a circular geometry with radial symmetry, with a substantially planar configuration having a main extension in a plane defined by a first axis x and by a second axis y (referred to in what follows as "plane of the sensor xy"), and negligible dimension, with respect to the main extension, in a direction parallel to a third axis (referred to in what follows as "orthogonal axis z"), forming with the first and second axes x, y a set of three orthogonal axes fixed with respect to the sensor structure. In particular, the driving mass 3 has in the plane of the sensor xy substantially the shape of an annulus, and defines at the center a circular empty space 6, the center O of which coincides with the centroid and the center of symmetry of the driving mass 3. The driving mass 3 is anchored to a substrate 2 by means of a central anchorage 7 arranged at the center O, to which it is connected through elastic anchorage elements 8. For example, the elastic anchorage elements 8 depart in a crosswise configuration from the center O along a first axis of symmetry A and a second axis of symmetry B of the driving mass 3, the axes of symmetry being parallel, respectively, to the first axis x and to the second axis y. The elastic anchorage elements 8 enable a rotary movement of the driving mass 3 about a drive axis passing through the center O, parallel to the orthogonal axis z and perpendicular to the plane of the sensor xy.

The driving mass 3 has a first pair of through-openings 9a, 9b with a substantially rectangular shape elongated in a direction parallel to the second axis y, aligned in a diametric direction along the first axis of symmetry A, and set on opposite sides with respect to the empty space 6. In particular, the direction of alignment of the through-openings 9a, 9b corresponds to a direction of detection of the microelectromechanical sensor 1 (in the case represented in the figure, coinciding with the first axis x).

The driving assembly 4 comprises a plurality of driven arms 10 (for example, eight in number), extending externally from the driving mass 3 in a radial direction and spaced apart at a same angular distance, and a plurality of first and second driving arms 12a, 12b, extending parallel to, and on opposite sides of, respective driven arms 10 and anchored to the substrate via respective anchorages. Each driven arm 10 carries a plurality of first electrodes 13, extending in a direction perpendicular to, and on either side of, the driven arm. Furthermore, each of the first and second driving arms 12a, 12b carries respective second electrodes 14a, 14b, extending towards the respective driven arm 10 and comb-fingered to the corresponding first electrodes 13. The first driving arms 12a are all arranged on the same side of the respective driven arms 10 and are all biased at a first voltage. Likewise, the second driving arms 12b are all arranged on the opposite side of the respective driven arms 10, and are all biased at a second voltage. In a per se known manner which is not described in detail, a driving circuit is connected to the second electrodes 14a, 14b so as to apply the first and second voltages and determine, by means of mutual and alternating attraction of the electrodes, an oscillatory rotary motion of the driving mass 3 about the drive axis, at a given oscillation frequency.

The microelectromechanical sensor 1 further comprises a first pair of acceleration sensors with axis parallel to the orthogonal axis z, and in particular a first pair of first sensing masses 16a, 16b, each positioned in a respective one of the through-openings 9a, 9b, so as to be completely enclosed and contained within the overall dimensions of the driving mass 3 in the plane of the sensor xy. The first sensing masses 16a, 16b have a generally rectangular shape matching the shape of the respective through opening 9a, 9b, and are formed by a first rectangular portion 17, which is wider, and by a second rectangular portion 18, which is narrower (along the first axis x), connected by a connecting portion 19, which is shorter (in a direction parallel to the second axis y) than the first and second rectangular portions. Each first sensing mass 16a, 16b has a centroid G located within the corresponding first rectangular portion 17, and is supported by a pair of elastic supporting elements 20. The elastic supporting elements 20 are connected to the connecting portion 19, and extend towards the driving mass 3, in a direction parallel to the second axis y. In other words, the elastic supporting elements 20 extend within recesses 21 provided at opposite sides of the sensing masses 16a, 16b. The elastic supporting elements 20 extend at a distance from the centroid G of the respective first sensing mass 16a, 16b, and form torsional springs that are rigid for the rotary motion of the driving mass 3, and also enable rotation of the sensing masses about an axis of rotation parallel to the second axis y and lying in the plane of the sensor xy (and, consequently, their movement out of the plane of the sensor xy).

A pair of first and second detection electrodes 22, 23 is arranged underneath the first and second rectangular portions 17, 18 of each one of the first sensing masses 16a-16b; for example the detection electrodes 22, 23 are constituted by regions of polycrystalline silicon formed on the substrate 2, having equal dimensions substantially corresponding to those of the second (and smaller) rectangular portion 18. The first and second detection electrodes 22, 23 are separated, respectively from the first and second rectangular portions 17, 18, by an air gap, and are connected to a read circuit. The first and second detection electrodes 22, 23 hence form, together with the first and second rectangular portions 17, 18 respective detection capacitors.

In use, the microelectromechanical sensor 1 is able to operate as a gyroscope, designed to detect an angular velocity $\vec{\Omega}_x$ (in FIG. 1 assumed as being counterclockwise), about the first axis x.

On the hypothesis of small displacements of the first sensing masses 16a-16b and of small rotations of the driving mass 3, the rotary movement of the driving mass 3 and of the first sensing masses 16a-16b about the drive axis can be represented by a driving-velocity vector $\vec{v}_a$, tangential to the circumference that describes the driving trajectory.

In particular, the rotary motion about the first axis x at the angular velocity $\vec{\Omega}_x$ determines a force acting on the entire structure, known as Coriolis force (designated by $\vec{F}_c$). In particular, the Coriolis force $\vec{F}_c$ is proportional to the vector product between the angular velocity $\vec{\Omega}_x$ and the driving velocity $\vec{v}_a$, and is hence directed along the orthogonal axis z, is zero in the points where the driving velocity $\vec{v}_a$ is parallel to the first axis x, and, in the points where it does not go to zero, it is directly proportional to the driving velocity $\vec{v}_a$, and consequently it increases with the distance from the center O. Over the entire structure, considered as a single rigid body, it is hence possible to identify a distribution of Coriolis forces that vary as the distance from the center O varies. The resultants of the Coriolis forces $\vec{F}_c$ acting on the first sensing masses 16a, 16b at the corresponding centroid G, cause rotation of the sensing masses, which move out of the plane of the sensor xy, about an axis parallel to the second axis y and passing through the first elastic supporting elements 20. This movement is allowed by the torsion of the first elastic supporting elements 20. Instead, the configuration of the elastic anchorage elements 8 is such as to inhibit, at least to a first approximation (see the following discussion), movement of the driving mass 3 out of the plane of the sensor xy, thus allowing decoupling of the motion of detection of the first sensing masses from the driving motion. The displacement of the first sensing masses 16a, 16b out of the plane of the sensor xy causes a differential capacitive variation of the detection capacitors, the value of which is proportional to the angular velocity $\vec{\Omega}_x$, which can hence be determined in a per-se known manner via a purposely provided read circuit. In particular, since the reading scheme is differential, the presence of a pair of first sensing masses enables automatic rejection of spurious linear accelerations along the orthogonal axis z. These accelerations, in fact, cause a variation in the same direction of the detection capacitors, which is cancelled by the differential reading (on the contrary, the same structure can be operated as an accelerometer for detecting the accelerations along the orthogonal axis z, simply by modifying the electrical connections between the sensing masses and electrodes). The presence of the central anchorage also enables rejection of spurious linear accelerations along the axes x and y, given that the arrangement of elastic anchorage elements 8 is extremely rigid in these directions, and does not enable displacement of the sensing masses. Furthermore, the described structure is able to mechanically reject spurious angular acceleration about the orthogonal axis z, since the frequency response of the sensor can be modeled as a very selective filter.

Although it is advantageous with respect to traditional gyroscope structures, the Applicant has realized that the described microelectromechanical sensor is not optimized, in particular with respect to the decoupling between the driving and sensing modes of operation.

In detail, the Applicant has realized that flaws in the manufacturing process or improper choices in the structure geometry (e.g. a thickness too small with respect to the dimensions in the plane of the sensor xy, or an improper shape of the elastic elements) may result in the microelectromechanical structure having an improper ratio between the stiffness in the orthogonal direction z and the stiffness in the plane of the sensor xy. In particular, the driving mass 3 could have an insufficient stiffness in the orthogonal direction z, so that application of the Coriolis force $F_c$ would lead to oscillations movement outside of the plane of the sensor xy not only by the sensing masses (as desired) but also by the same driving mass (contrary to the expected operation). In other words, the decoupling between the driving and sensing movements could be impaired.

FIG. 2 shows a situation in which the stiffness of the structure in the orthogonal direction z (provided by the elastic anchorage elements 8 connecting the driving mass 3 to the central anchorage 7) is not sufficient to avoid undesired movements of the driving mass 3 outside the plane of the sensor xy, following application of the Coriolis force $F_c$.

The lack of a perfect decoupling between the driving and sensing movements entails a number of disadvantages in the microelectromechanical sensor.

Firstly, any non-ideality in the driving arrangement affects also the sensing arrangement, and vice versa.

Secondly, during sensing operations, the driving movement is altered, mainly due to the variation in the facing area of the driving electrodes (first electrodes 13 and corresponding second electrodes 14a, 14b), because of the movement of the driving mass 3 outside of the plane of the sensor xy. Indeed, the Coriolis force $F_c$ is a function of the tangential driving velocity $\vec{v}_a$, according to the expression:

$$F_c = 2 \cdot m \cdot \vec{\Omega} \times \vec{v}_a$$

wherein m is the mass of the sensing mass, $\vec{\Omega}$ is the angular velocity that is to be detected (e.g. the angular velocity $\vec{\Omega}_x$) and $\vec{v}_a$ is the driving velocity at the application point of the Coriolis force $F_c$. A variation of the driving velocity $\vec{v}_a$ due to a different facing area between the electrodes causes a corresponding variation of the Coriolis force $F_c$ and a variation in the output gain of the sensor. As a result, an undesired variation of the overall sensitivity of the microelectromechanical sensor 1 may occur.

Finally, a structure that is compliant (to a certain degree) outside the plane of the sensor xy is inevitably more affected to shock directed along the orthogonal direction z.

BRIEF SUMMARY

One embodiment of the present invention provides an integrated microelectromechanical structure that allows the aforesaid problems and disadvantages to be overcome, and in particular that has an improved mechanical decoupling between driving and sensing modes.

According to one embodiment of the present invention, an integrated microelectromechanical structure is consequently provided as defined in the present disclosure.

BRIEF DESCRIPTION OF THE SEVERAL VIEWS OF THE DRAWINGS

For a better understanding of the present invention, preferred embodiments thereof are now described purely by way of non-limiting examples and with reference to the attached drawings, wherein.

DETAILED DESCRIPTION

One embodiment of the present invention envisages the provision of additional anchorages and elastic anchorage elements connected to the driving mass 3 in order to improve the stiffness of the same driving mass 3 for movements outside the plane of the sensor xy.

Figure 1:
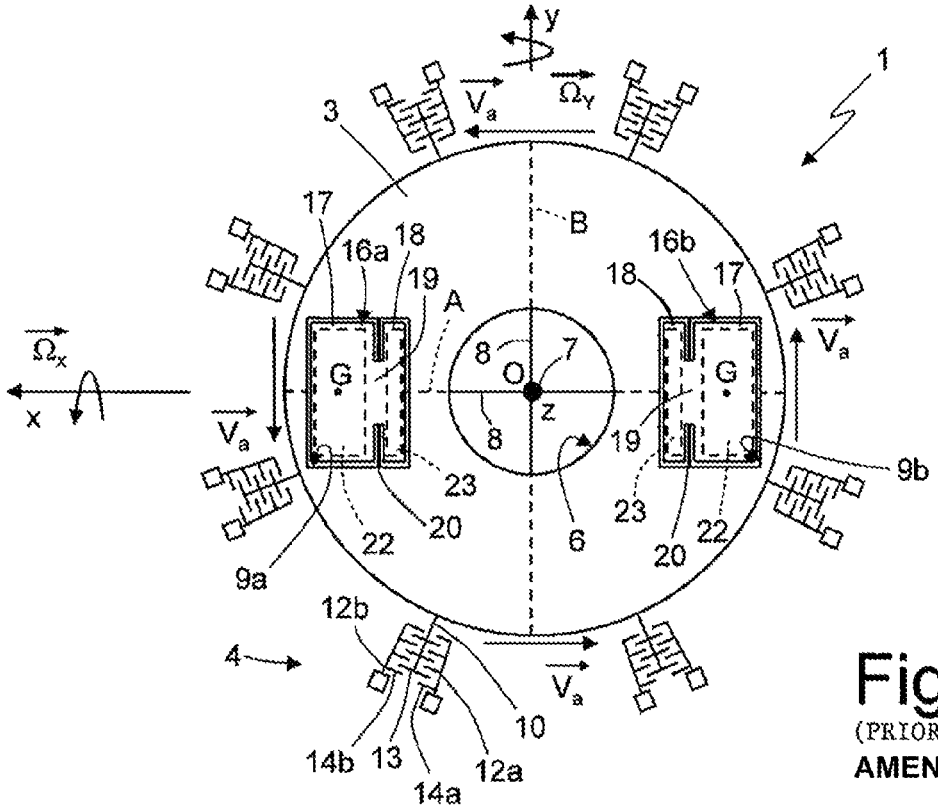
Fig.1 (PRIOR ART)
FIG. 1 is a schematic top plan view of a microelectromechanical structure of a known type.
Figure 2:
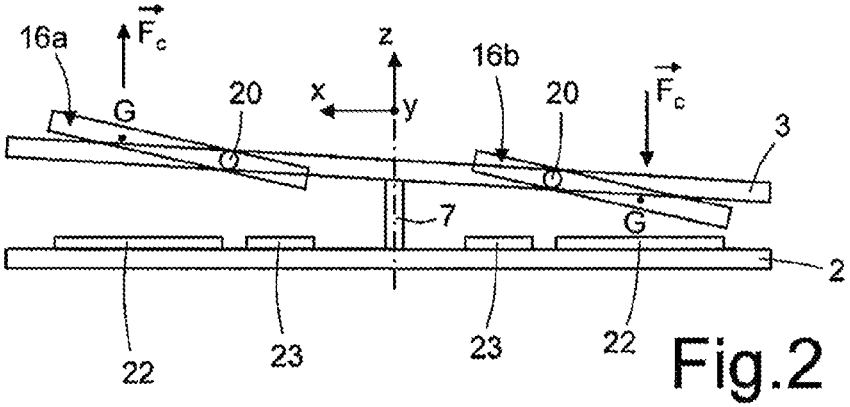
Fig.2 (PRIOR ART)
FIG. 2 is a schematic lateral section of the structure of FIG. 1, during a sensing operating mode.
Figure 3:
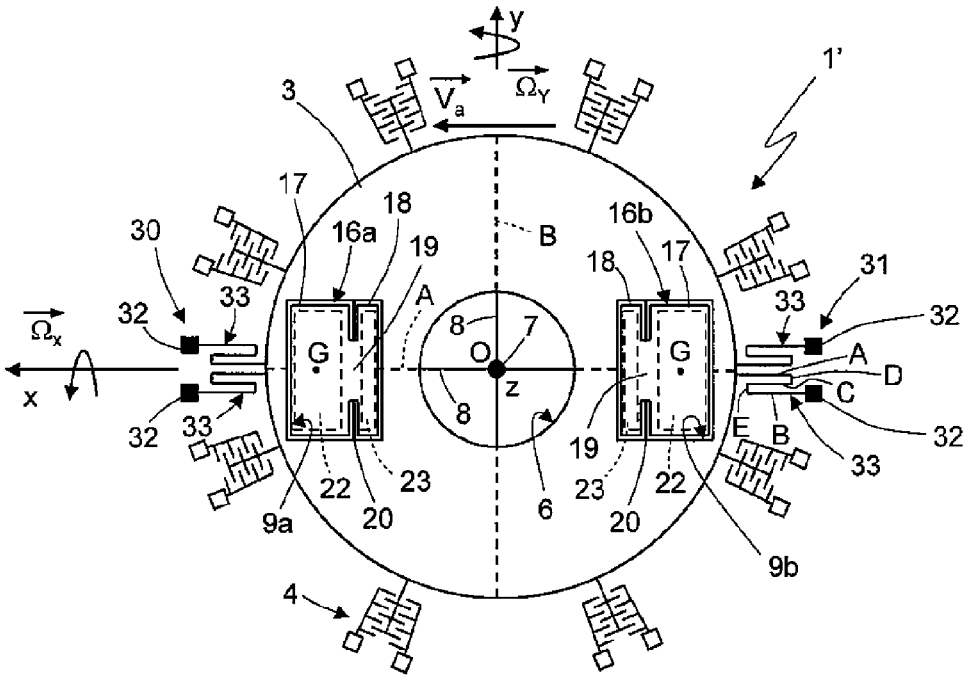
FIG. 3 is a schematic top plan view of a microelectromechanical structure according to one embodiment of the present invention.

As shown in FIG. 3 wherein same reference numerals refer to same elements as those in FIG. 1, the microelectromechanical sensor, here denoted with 1', differs from the sensor described with reference to FIG. 1 in that it further comprises a first and a second external anchorage arrangements 30, 31, coupled to the driving mass 3.

In detail, the first and second external anchorage arrangements 30, 31 are positioned externally of the driving mass 3, and are coupled to opposite sides of the same driving mass 3, with respect to the empty space 6 and center O; in the exemplary embodiment shown in FIG. 3, the first and second external anchorage arrangements 30, 31 are also aligned along the first axis x, and are diametrically opposite and symmetric with respect to the empty space 6.

Each of the first and second external anchorage arrangements 30, 31 includes a pair of external anchorages 32 (each one coupled to the substrate 2, as shown in the following FIG. 4) and a pair of external elastic anchorage elements 33, coupling a respective external anchorage 32 to the driving mass 3. In the exemplary embodiment of FIG. 3, the external anchorages 32 and external elastic anchorage elements 33 of each pair are arranged on opposite sides of, and symmetrically with respect to, the first axis x.

Each one of the external elastic anchorage elements 33 comprises a folded spring, generically extending along the first axis x and having the shape of a "S-shaped" folded beam. In greater detail, each folded spring includes: a first arm A, extending along the first axis x and connected to a respective outer side of the driving mass 3; a second arm B extending along the first axis x, parallel to the first arm A, and connected to a respective external anchorage 32; an intermediate arm C, also extending along the first axis x, and interposed between the first and second arms A, B in the second direction y; and a first and a second connecting portions D, E, extending along the second axis y and connecting (at a 90° angle) a respective end of the intermediate arm to the first arm A and to the second arm B, respectively.

Operation of the microelectromechanical sensor 1' does not differ from the one previously discussed with reference to FIG. 1, so that an angular velocity $\vec{\Omega}_x$ about the first axis x is sensed by the sensor as a function of the displacement of the pair of first sensing masses 16a, 16b out of the plane of the sensor xy (caused by the Coriolis Force $F_c$) and the associated capacitance variation of the detection capacitors.

However, the presence of the additional first and second external anchorage arrangements 30, 31 improves the overall stiffness of the driving mass 3 and allows to achieve an improved decoupling of the driving and sensing modes, particularly avoiding undesired movements of the driving mass 3 outside of the plane of the sensor xy.

Figure 4:
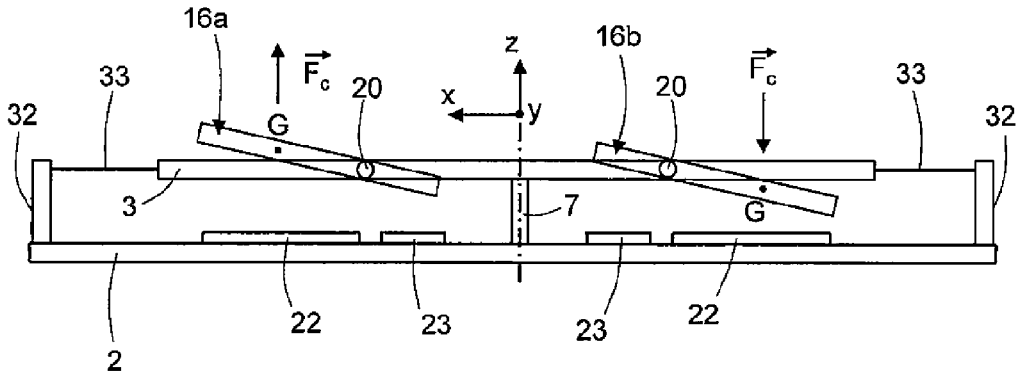
FIG. 4 is a schematic lateral section of the structure of FIG. 3, during a sensing operating mode.

In other words, and as shown in FIG. 4, when the Coriolis force $F_c$ acts on the structure, only the first sensing masses 16a, 16b undergo a rotation outside the plane of the sensor xy, while the movement of the driving mass 3 remains substantially unaltered (and lying in the plane of the sensor xy), so that the sensitivity of the sensor is not affected. Also, it has been proven that undesired vibration modes of the structure, that may arise due to the presence of the additional anchorage elements, are sufficiently removed that they do not interfere with the correct operation of the sensor.

Furthermore, the first and second external anchorage arrangements 30, 31 are configured in such a manner that they have a minimum stiffness in the plane of the sensor xy, and they substantially do not influence the driving dynamic in the plane of the sensor xy and in particular they do not alter the driving movement of the driving mass 3. Indeed, the folded spring can be subjected to large movements in the plane of the sensor xy, so that they do not influence the linearity of the system. Also, the Applicant has proven that the residual stresses that could be generated due to the presence in the structure of different anchoring points to the substrate 2 are minimized by the disclosed anchorage arrangement (in particular, due to the minimum stiffness in the plane of the sensor xy of the external anchorage elements 30, 31, the residual stresses, if present, do not influence the driving dynamic).

Figure 5:
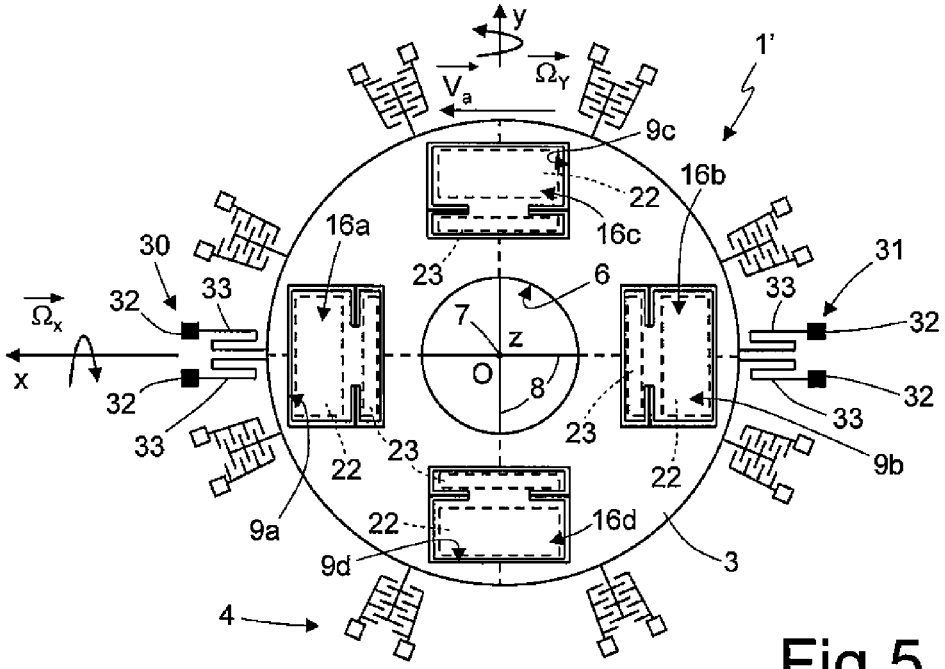
FIG. 5 shows an embodiment of a biaxial sensor.

FIG. 5 shows a biaxial sensor structure according to a further embodiment of the present invention.

The microelectromechanical sensor 1' further includes: a second pair of through-openings 9c, 9d, which are aligned along the second axis y, are of a substantially rectangular shape elongated in a direction parallel to the first axis x, and are arranged on opposite sides with respect to the empty space 6; and a second pair of acceleration sensors with axis parallel to the orthogonal axis z, and in particular a second pair of first sensing masses 16c, 16d, housed within the through-openings 9c, 9d, and completely enclosed and contained within the driving mass 3. The first sensing masses 16c, 16d are obtained by rotation through 90° of the first sensing masses 16a, 16b, and consequently the corresponding elastic supporting elements 20 extend parallel to the first axis x and enable rotation of the respective sensing masses about an axis of rotation parallel to the first axis x. A second pair of first and second detection electrodes 22, 23 is arranged underneath the first sensing masses 16c, 16d, forming therewith respective detection capacitors. In use, the microelectromechanical sensor 1' is also able to detect an angular velocity $\vec{\Omega}_y$ about the second axis y. The rotary motion about the second axis y causes a Coriolis force $F_c$, once again directed along the orthogonal axis z, which causes rotation of the first sensing masses 16c, 16d about the axis of rotation parallel to the first axis x, and consequent opposite unbalancing of the detection capacitors. In particular, a rotation about the first axis x is not sensed by the second pair of first sensing masses 16c, 16d, in so far as the resultant Coriolis force $\vec{F}_c$ is zero (on account of the fact that the vector product between the angular velocity $\vec{\Omega}_x$ and the corresponding driving velocity $\vec{v}_a$ is, at least in a first approximation, zero). Likewise, the rotation about the second axis y is not sensed for similar reasons by the first pair of first sensing masses 16a, 16b, and consequently the two axes of detection are not affected and are decoupled from one another.

A still different embodiment of the present invention envisages a microelectromechanical structure sensing also angular velocities about the orthogonal axis z (thus operating as a triaxial sensor).

Figure 6:
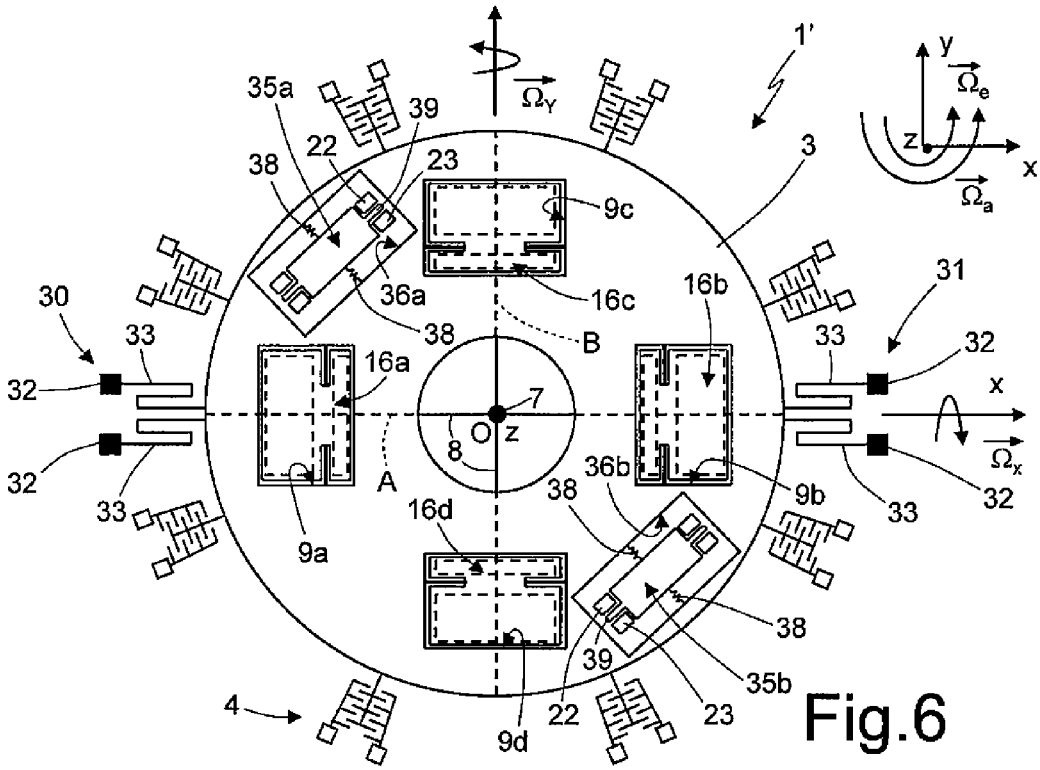
FIG. 6 shows an embodiment of a triaxial sensor.

In detail (see FIG. 6), the microelectromechanical sensor 1' further comprises a pair of accelerometers with axis lying in the plane of the sensor xy (for example, with their axis lying at an angle of about 45° with respect to the first and second axes x, y), and in particular a pair of second sensing masses 35a, 35b set within a third pair of through-openings 36a, 36b. The through-openings 36a, 36b are rectangular and are aligned in a radial direction (in the example of FIG. 6, inclined of about 45° with respect to the x and y axes) with their main extension in a direction orthogonal to the radial direction. The second sensing masses 35a, 35b have a generally rectangular shape with sides parallel to corresponding sides of the through-openings 36a, 36b, are suspended with respect to the substrate 2, and are connected to the driving mass 3 via second elastic supporting elements 38. The second elastic supporting elements 38 originate from a point situated approximately at the center of main sides of the second sensing masses 35a, 35b, and extend in the first radial direction. In particular, the second elastic supporting elements 38 are rigid with respect to the driving motion of the driving mass 3, and exclusively enable a movement in the radial direction of the respective second sensing masses, while hindering movement in other directions (in other words, they are compliant exclusively in the first radial direction). Furthermore, the second sensing masses 35a, 35b have extensions 39 extending from a point situated approximately at the centre of corresponding smaller sides along the direction orthogonal to the first radial direction. The extensions 39, together with fixed electrodes anchored to the substrate, facing the extensions 39 and parallel thereto, form detection capacitors with plane and parallel plates. For example, from each smaller side of each second sensing mass 35a, 35b a respective extension 39 originates, facing and set between two fixed electrodes. In a way similar to what has been previously described, it is possible to denote, as first detection electrodes 22, the fixed electrodes arranged in a radially outer position, and as second detection electrodes 23 the fixed electrodes arranged in a radially inner position with respect to the center O. Alternatively, a higher number of electrodes can be provided, comb-fingered to one another. In any event, the detection capacitors are in this case in the plane of the sensor xy.

In use, the driving mass 3 is rotated about the orthogonal axis z with a driving angular velocity $\vec{\Omega}_a$ (for example, counter-clockwise), dragging along with it the second sensing masses 35a, 35b. An external angular velocity $\vec{\Omega}_e$ to be detected, which also acts about the orthogonal axis z, generates a Coriolis force $\vec{F}_c$ on the second sensing masses 35a, 35b directed in the radial direction (hence directed as a centrifugal force acting on the same masses), causing displacement of the second sensing masses and a capacitive variation of the detection capacitors (as discussed in greater detail in the above application US2007/214883).

It is evident that the second sensing masses 35a, 35b can be aligned in any direction of the plane of the sensor xy, the third axis of detection being orthogonal to the plane of the sensor xy and constituting an axis of yaw out of the plane of the sensor xy.

Figure 7:
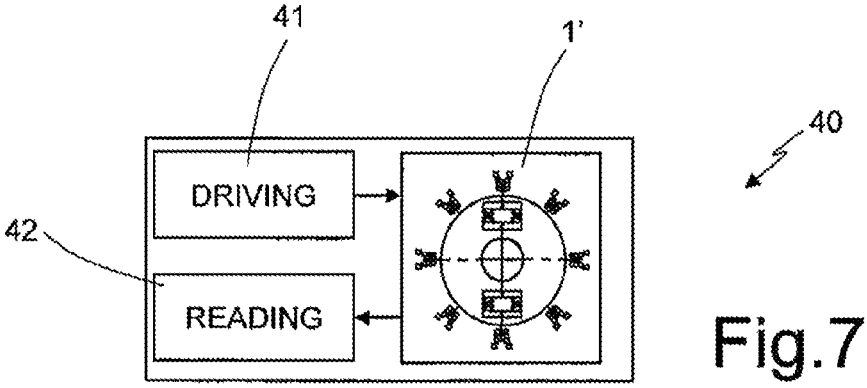
FIG. 7 shows a block diagram of a sensor device provided with the microelectromechanical structure according to a further embodiment of the invention.

FIG. 7 illustrates a sensor device 40 according to a further embodiment and comprising: the microelectromechanical sensor 1'; a driving circuit 41, connected to the driving assembly 4 for imparting the rotary driving motion on the driving mass 3; and a read circuit 42, connected to the detection electrodes 22, 23 for detecting the displacements of the sensing masses. The read circuit 42 is also configured to switch a mode of operation of the microelectromechanical sensor 1' between a gyroscope mode and an accelerometer mode, by simply modifying the electrical connections between the sensing masses and the electrodes.

The advantages of the microelectromechanical sensor are clear from the foregoing description.

In particular, adding further external anchorages and elastic anchorage elements (particularly of the folded type) allows to achieve, when necessary (e.g. when flaws in the manufacturing process occur), an improved decoupling between the driving and sensing modes, and particularly:

a reduced interference of the driving arrangement on the sensing arrangement;

a farther separation of the undesired vibration modes away from the operating frequency range;

an improved control of the sensitivity; and an improved resistance to external shocks.

The use of folded springs for the external elastic anchorage elements allows a greater displacement of the driving mass 3 in the plane of the sensor xy (compared to other type of springs), and minimizes possible disturbance effects on the linearity of the system.

A correct sizing of the additional external anchorage arrangements assures the linearity of the sensor and does not introduce any further residual stress in the sensor structure.

Moreover, the microelectromechanical sensor has compact dimensions, given the presence of a single driving mass that encloses in its overall dimensions the sensing masses. The rotary motion of the driving mass enables two components of driving velocity, orthogonal to one another in the plane of the sensor, to be automatically obtained, and hence effective implementation of a biaxial detection.

Finally, it is clear that modifications and variations can be made to what is described and illustrated herein, without thereby departing from the scope of the present invention.

In particular, a different number and positioning of the external anchorages and elastic anchorage elements may be provided, as well as a different shape and type of the same elastic anchorage elements, different from the folded one (e.g. "L-shaped" elastic elements could equally be used, or other stress-release elastic elements).

The driving mass 3 can have a shape different from the circular one, for example any closed polygonal shape. Furthermore, even though this may not be advantageous, said shape may not have a perfect radial symmetry (or in general any other type of symmetry).

In a per-se known manner, the displacement of the sensing masses can be detected with a different technique other than the capacitive one, for example, by detecting a magnetic force.

Furthermore, the torsional moment for causing the driving mass to oscillate with rotary motion can be generated in a different manner, for example by means of parallel-plate electrodes, or else magnetic actuation.

The various embodiments described above can be combined to provide further embodiments. All of the above U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated microelectromechanical structure, comprising:

a substrate;

a driving mass designed to be moved [with a rotary motion about an axis of rotation and having a central aperture] *relative to a central axis*;

a first anchorage [arrangement positioned in the central aperture and structured to anchor the driving mass to the substrate;] *arranged at the central axis and coupled to the substrate;*

[a first opening provided within said driving mass;]

*elastic anchorage elements coupling the driving mass to the first anchorage;* a first sensing mass [of a first type arranged inside said first opening];

first elastic supporting elements [connecting] *coupling* said first sensing mass to said driving mass and configured to enable the first sensing mass *to move in a first direction in response to a first acceleration* to perform a first detection movement[in the presence of a first external stress];

*a second sensing mass that is of a type that is different from the first sensing mass;*

*second elastic supporting elements coupled between the driving mass and the second sensing mass and configured to enable the second sensing mass to perform a second detection movement in response to a second acceleration, said first detection movement being a rotational movement about a first axis lying in a plane of said driving mass, and said second detection movement being a linear movement along a second axis lying in said plane;* a second anchorage [arrangement] positioned externally of said driving mass and coupled to a first side of the driving mass;

a third anchorage [arrangement] positioned externally of said driving mass and coupled to a second side of the driving mass, the second side being opposite to the first side;

wherein said first elastic supporting elements and said first, second and third [anchorage arrangements] *anchorages* are [so] configured *so* that said [driving] *first sensing* mass is fixed to said [first sensing] *driving* mass [of the first type in said rotary motion] *and driven relative to the central axis*, and *the first sensing mass* is decoupled [therefrom in said detection movement] *from the driving mass when moving in said first direction.*

2. The structure according to claim 1, wherein said driving mass has an annular shape extending substantially in a plane, *and* said *central* axis [of rotation] is perpendicular to said plane, [and said first anchorage arrangement includes: a central anchorage arranged substantially at a center of said driving mass in the central aperture defined by said annular shape, and central elastic anchorage elements coupling said central anchorage to said driving mass, extending in said central aperture; and] wherein said second side is opposite to said first side *of the driving mass* with respect to said central [aperture] *axis*.

3. The structure according to claim [2] *1*, wherein said second and third [anchorage arrangements] *anchorages* are diametrically opposite and symmetric with respect to said central [aperture] *axis*.

4. The structure according to claim 1, wherein each of said second and third [anchorage arrangements] *anchorages* comprises an external anchorage *member* coupled to the substrate, and an external elastic anchorage element coupling said external anchorage to said driving mass, extending outside said driving mass.

5. The structure according to claim 4, wherein said external elastic anchorage element comprises a folded spring.

6. The structure according to claim 1, wherein each of said second and third [anchorage arrangements] *anchorages* comprises a pair of external anchorages *members* coupled to the substrate, and a pair of folded springs connecting a respective one of said external anchorages *members* to said driving mass.

7. The structure according to claim 1, wherein said [external stress] *first acceleration* is *generated by* a Coriolis force acting in a direction perpendicular to a plane of said driving mass, and said first detection movement is a rotation outside said plane about an axis defined by said *first* elastic supporting elements.

8. The structure according to claim 1, wherein said driving mass extends substantially in a plane and the structure further comprises:

a second sensing mass [of the first type, which] *that* is aligned with said first sensing mass [of the first type] along a first axis of detection lying in said plane [and is arranged in a second opening provided within said driving mass], said first and second sensing masses [of the first type being enclosed in overall dimensions] *located inward* of said driving mass in said plane; and detection means associated with each of said first and second sensing masses [of the first type] for detecting [said] *a* first detection movement, said first detection movement being a rotational movement about an axis lying in said plane [and perpendicular to said first axis of detection].

9. The structure according to claim 8, wherein said detection means are configured to implement a differential detection scheme.

10. The structure according to claim 8, wherein said detection means include detection electrodes which are set facing said first and second sensing masses [of the first type].

11. The structure according to claim 1, further comprising:

a second sensing mass [of the first type,] forming with said first sensing mass [of the first type] a first pair of sensing masses [of the first type] aligned along a first axis of detection lying in a plane [on opposite sides with respect to said first anchorage arrangement]; and a second pair of sensing masses [of the first type] aligned along a second axis of detection lying in said plane and orthogonal to said first axis of detection[, on opposite sides of said first anchorage arrangement].

[12. The structure according to claim 1, further comprising:

a sensing mass of a second type arranged inside a second opening provided within said driving mass; and second elastic supporting elements coupled between the driving mass and the sensing mass of the second type and configured to enable the sensing mass of the second type to perform a second detection movement in a presence of a second external stress, said first detection movement being a rotational movement about a first axis lying in a plane of said driving mass, and said second detection movement being a linear movement along a second axis lying in said plane.]

13. The structure according to claim [12] *1*, wherein said second [external stress is] *acceleration is generated by* a Coriolis force acting in a radial direction, and said linear movement is directed along said radial direction.

14. The structure according to claim [12] *1*, [defining a triaxial gyroscope,] further including:

a [second] *third* sensing mass [of the first type,] forming with said first sensing mass of the first type a first pair of sensing masses [of the first type] aligned along a first axis of detection lying in a plane on opposite sides with respect to said first anchorage [arrangement]; and a second pair of sensing masses [of the first type] aligned along a second axis of detection lying in said plane and orthogonal to said first axis of detection, on opposite sides of said first anchorage [arrangement], wherein said first and second pairs of sensing masses [of the first type] are configured to detect, respectively, a first external angular velocity and a second external angular velocity about said first and second axis of detection, and said *second* sensing mass [of the second type] is configured to detect a third external angular velocity about a third axis of detection orthogonal to said plane.

[15. A sensor device comprising:

a microelectromechanical structure including:

a driving mass designed to be moved with a rotary motion about an axis of rotation;

a first anchorage positioned along said axis of rotation;

first elastic anchorage elements anchoring said driving mass to said first anchorage;

a first opening provided within said driving mass;

a first sensing mass arranged inside said first opening;

first elastic supporting elements connecting said first sensing mass to said driving mass and configured to enable said first sensing mass to perform a first detection movement in the presence of an external stress;

a second anchorage positioned externally of said driving mass; and a second elastic anchorage element coupling an external side of the driving mass to said second anchorage;

wherein said first elastic supporting elements and said first and second elastic anchorage elements are so configured that said first sensing mass is fixed to said driving mass in said rotary motion, and is substantially decoupled from said driving mass in said detection movement.]

[16. The sensor device according to claim 15, further comprising a read stage configured to switch a mode of operation of said microelectromechanical structure between a gyroscope mode and an accelerometer mode.]

[17. The sensor device of claim 15, wherein the second elastic anchorage element couples a first side of the driving mass to said second anchorage, the sensor device further comprising:

a third anchorage positioned externally of said driving mass; and a third elastic anchorage element coupling a second side of the driving mass to said third anchorage.]

[18. The sensor device according to claim 15, wherein the first sensing mass is of a first type, the microelectromechanical structure further comprising:

a sensing mass of a second type arranged inside a second opening provided within said driving mass; and second elastic supporting elements coupled between the driving mass and the sensing mass of the second type and configured to enable the sensing mass of the second type to perform a second detection movement in a presence of a second external stress, said first detection movement being a rotational movement about a first axis, and said second detection movement being a linear movement along a second axis.]

[19. The sensor device according to claim 18, defining a triaxial gyroscope, the microelectromechanical structure further including:

a second sensing mass of the first type, forming with said first sensing mass of the first type a first pair of sensing masses of the first type aligned along a first axis of detection on opposite sides with respect to said first anchorage; and a second pair of sensing masses of the first type aligned along a second axis of detection orthogonal to said first axis of detection, on opposite sides of said first anchorage, wherein said first and second pairs of sensing masses of the first type are configured to detect, respectively, a first external angular velocity and a second external angular velocity about said first and second axis of detection, and said sensing mass of the second type is configured to detect a third external angular velocity about a third axis of detection orthogonal to first and second axes of detection.]

20. A microelectromechanical device comprising:

a first anchorage;

first elastic anchorage elements;

a driving mass operable to move in a rotary motion about an axis of rotation, the driving mass being anchored via the first elastic anchorage elements to the first anchorage positioned along the axis of rotation and the driving mass substantially extending in a plane perpendicular to the axis of rotation;

a first opening [disposed] *positioned* within the driving mass;

first elastic supporting elements;

a first sensing mass of a first type [disposed] *positioned* within the first opening and *having side surfaces enclosed by said driving mass, the first sensing mass being* coupled to the driving mass via the first elastic supporting elements, *the first elastic supporting elements being configured* to allow for a first detection movement in response to a first external stress, the first detection movement being a rotational movement outside the plane about an axis lying in the plane;

a pair of [further] *second* anchorages positioned externally of the driving mass;

[further] *second* elastic anchorage elements [coupling], *each of the second elastic anchorage elements being coupled between one of* the [further] *second* anchorages [to opposite] *and external* sides of said driving mass;

the first elastic supporting elements and the first and further elastic anchorage elements being configured to fix the first sensing mass to the driving mass during said rotary motion, and [wherein] the first and further elastic anchorage elements [are] *being* configured to prevent said driving mass from undergoing said rotational movement outside the plane in response to said first external stress.

21. The device according to claim 20, further comprising:

a second sensing mass of the first type, which is aligned with said first sensing mass of the first type along a first axis of detection lying in said plane and is arranged in a second opening provided within said driving mass, said first and second sensing masses of the first type being enclosed in overall dimensions of said driving mass in said plane; and detection means associated with each of said first and second sensing masses of the first type for detecting said first detection movement, said first detection movement being a rotational movement about an axis lying in said plane and perpendicular to said first axis of detection.

22. The device according to claim 20, further comprising a *second* sensing mass of a second type arranged inside a second opening provided within said driving mass and [connected] *coupled* to said driving mass via second elastic supporting elements in such a manner so as to perform a second detection movement in a presence of a second external stress, said first detection movement being a rotational movement about a first axis lying in said plane, and said second detection movement being a linear movement along a second axis lying in said plane.

23. The device according to claim 22, wherein said second external stress is a Coriolis force acting in a radial direction, and said linear movement is directed along said radial direction.

24. The device according to claim 22, [defining a triaxial gyroscope,] further including:

a [second] *third* sensing mass of the first type, forming with said first sensing mass of the first type a first pair of sensing masses of the first type aligned along a first axis of detection lying in a plane on opposite first and second sides with respect to said first anchorage; and a second pair of sensing masses of the first type aligned along a second axis of detection lying in said plane and orthogonal to said first axis of detection, on opposite third and fourth sides of said first anchorage, wherein said first and second pairs of sensing masses of the first type are configured to detect, respectively, a first external angular velocity and a second external angular velocity about said first and second axes of detection, and said *second* sensing mass of the second type is configured to detect a third external angular velocity about a third axis of detection orthogonal to said plane.

* * * * *